UNITED STATES PATENT OFFICE.

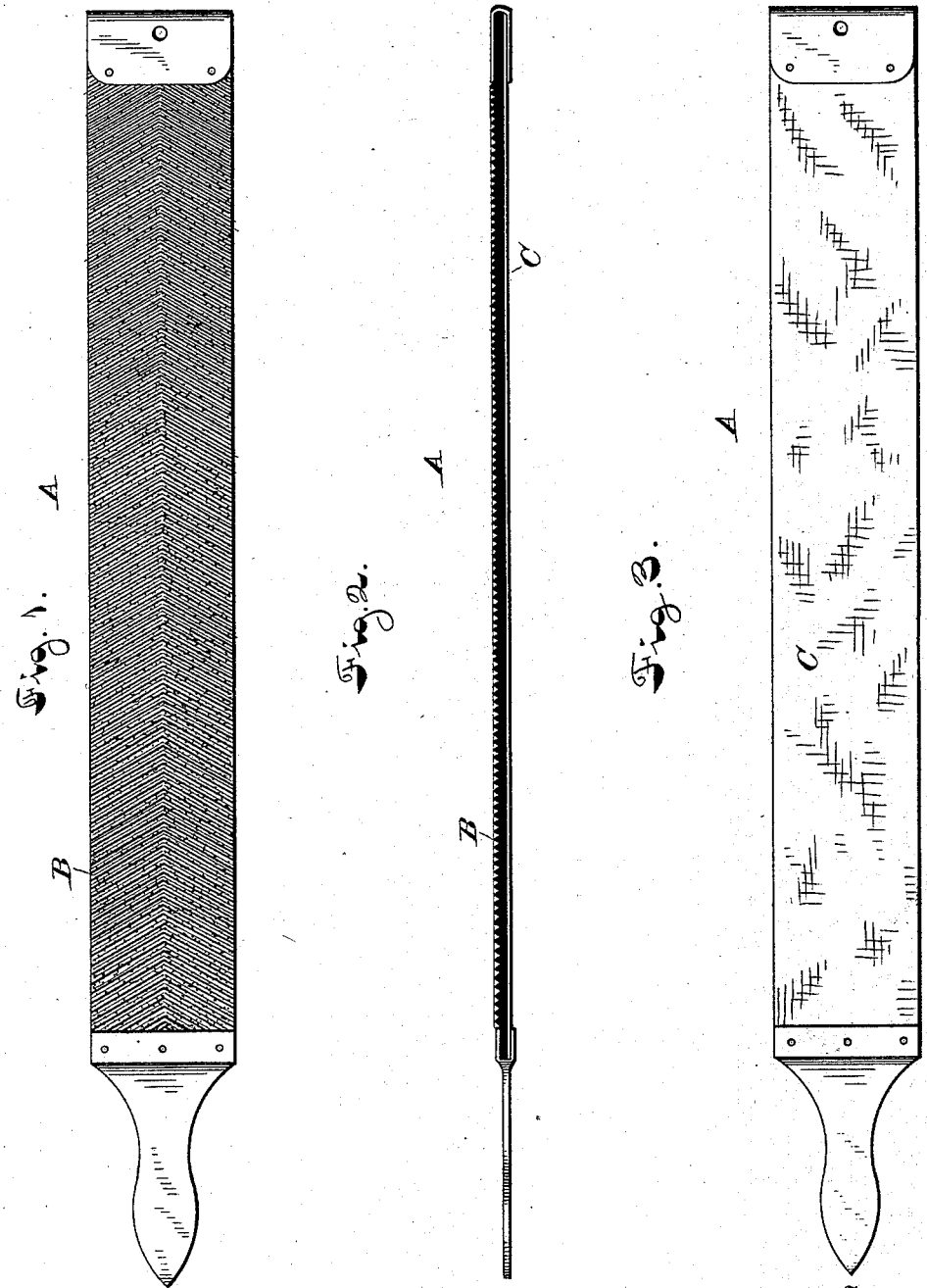

WESLEY I. NICHOLS, OF NEW YORK, N. Y.

RAZOR-STROP.

SPECIFICATION forming part of Letters Patent No. 413,540, dated October 22, 1889.

Application filed April 11, 1889. Serial No. 306,791. (No model.)

*To all whom it may concern:*

Be it known that I, WESLEY I. NICHOLS, a citizen of the United States, residing in the city and State of New York, have invented certain new and useful Improvements in Razor-Strops, of which the following is a full and clear description, reference being had to the accompanying drawings, forming part of this specification, in which—

Figure 1 is a plan view of my improved strop. Fig. 2 is an edge view of the same, and Fig. 3 is a view of the opposite side.

My present invention relates to strops for stropping and sharpening razors and other cutlery; and it consists of the combination and arrangement of devices hereinafter explained and claimed.

To enable others skilled in the art to make and use my invention, I will proceed to explain the exact manner in which I have carried it out.

In the drawings, A represents my improved strop, which on the side B is composed of very fine emery thoroughly mixed with rubber, while the side C is covered with cotton or other suitable canvas. The rubber side of the strop is provided with very fine grooves or corrugations formed at right angles from the center of the strop to the edge, as shown in Fig. 1.

I am aware that a plain smooth strap of rubber has been used, and to which dust adhered and was rubbed into the pores of the rubber, when the strap would become hard and glossy and useless for the purpose of sharpening razors. By my present invention I obviate this difficulty, as my corrugated or grooved surface throws off the dust. The exposed points of contact, being elastic, spring back when pressed upon in sharpening a razor. As the points or sharp edges wear off a new cutting-surface is constantly presented to the razor, and the rubber being gritty it takes hold of the metal.

Having thus described my invention, what I claim as new, and desire to secure by Letters Patent, is—

1. A razor-strop having a canvas backing and a face composed of rubber having fine emery mixed therewith, said rubber face being grooved in diagonal lines from the center toward each side, substantially as described.

2. A razor-strop having its face formed with diagonal grooves extending from the center of the strop to each side, substantially as described.

WESLEY I. NICHOLS.

Witnesses:
 FREDERICK BOSS,
 HENRY M. LEE.